(12) United States Patent
Richards

(10) Patent No.: US 9,031,165 B2
(45) Date of Patent: May 12, 2015

(54) EFFICIENT SIGNAL PROCESSING FOR RECEIVE AND TRANSMIT DBF ARRAYS

(71) Applicant: Cubic Corporation, San Diego, CA (US)

(72) Inventor: Wayne Edward Richards, La Mesa, CA (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 14/218,730

(22) Filed: Mar. 18, 2014

(65) Prior Publication Data

US 2014/0321578 A1      Oct. 30, 2014

Related U.S. Application Data

(60) Provisional application No. 61/815,548, filed on Apr. 24, 2013.

(51) Int. Cl.
*H04L 27/20* (2006.01)
*H04L 27/22* (2006.01)
(Continued)

(52) U.S. Cl.
CPC .............. *H04L 27/22* (2013.01); *H04L 27/20* (2013.01); *H04B 7/0617* (2013.01); *H04B 7/086* (2013.01)

(58) Field of Classification Search
CPC ....... H04L 27/20; H04L 27/22; H04B 7/0617; H04B 7/086
USPC ......... 375/146, 147, 219, 261, 267, 295, 299, 375/308, 350
See application file for complete search history.

(56) References Cited

U.S. PATENT DOCUMENTS 5,809,422 A *  9/1998  Raleigh et al. ................ 455/449
6,052,085 A *  4/2000  Hanson et al. ................ 342/373
(Continued)

FOREIGN PATENT DOCUMENTS

WO      2014/176009 A1      10/2014

OTHER PUBLICATIONS

E. Venosa et al., "Polyphase Analysis Filter Bank Down—Converts Unequal Channel Bandwidths with Arbitrary Center Frequencies—Design I," *Proc. of SDR'10—Software Defined Radio Technical Conference and Product Exposition*, Washington DC, Nov. 30-Dec. 3, 2010.

(Continued)

*Primary Examiner* — Sam K Ahn
*Assistant Examiner* — Syed Haider
(74) *Attorney, Agent, or Firm* — Kilpatrick Townsend & Stockton LLP

(57) ABSTRACT

In a phased-array communications system with a distributed processing architecture, channelized beamforming is used to minimize sampling and computational requirements, as well as reduce the data rates required for the communication of data and control information between system components. A central processor within the phased array system performs parallelized synthesis of channelized beams to form beams composite beams in sub-bands that overlap multiple channels. The phased array system incorporates a flexible scheme for channelization, channelized beamforming, and synthesis so that any number of composite beams may be synthesized in parallel at any one time. The system is capable of simultaneously processing beams that occupy overlapping subbands, and does not require restriction on the bandwidths or center frequencies of the subbands which the beams occupy.

14 Claims, 8 Drawing Sheets

(51) Int. Cl.
*H04B 7/06* (2006.01)
*H04B 7/08* (2006.01)

(56) References Cited

U.S. PATENT DOCUMENTS

| | | | |
|---|---|---|---|
| 6,898,235 B1 | 5/2005 | Carlin et al. | |
| 7,830,982 B2* | 11/2010 | Mesecher | 375/299 |
| 8,224,387 B2 | 7/2012 | Bishop | |
| 2005/0276335 A1* | 12/2005 | Kumar | 375/260 |
| 2007/0064824 A1* | 3/2007 | Wang et al. | 375/260 |
| 2008/0089396 A1* | 4/2008 | Zhang et al. | 375/220 |
| 2009/0231197 A1 | 9/2009 | Richards | |

OTHER PUBLICATIONS

X. Chen et al., "Polyphase Synthesis Filter Bank Up—Converts Unequal Channel Bandwidths with Arbitrary Center Frequencies—Design II," *Proc. of SDR'10—Software Defined Radio Technical Conference and Product Exposition*, Washington DC, Nov. 30-Dec. 3, 2010.

ISR/WO mailed on Jul. 11, 2014 for International Patent Application PCT/US2014/032636 filed on Apr. 2, 2014, all pages.

* cited by examiner

EFFICIENT SIGNAL PROCESSING FOR RECEIVE AND TRANSMIT DBF ARRAYS

This application is a non-provisional of U.S. Provisional Patent Application No. 61/815,548, filed Apr. 24, 2013, and entitled "Efficient Signal Processing For Receive and Transmit DBF Arrays" which is incorporated by reference in its entirety for all purposes.

BACKGROUND

Aspects of the disclosure relate in general to a phased array system for efficiently and simultaneously processing multiple signals by applying distributed processing, channelization, and channel synthesis.

Modern phased array communication systems often include hundreds or thousands of antenna elements used to transmit and receive multiple beams across a wide range of frequencies. In such systems, the signal processing requirements can be substantial, especially when wideband signals are involved. For this reason, some phased array systems have been designed to incorporate a distributed signal processing architecture that involves multiple local processors that each perform certain signal processing and beamforming tasks specific to a single antenna or group of adjacent antennas. The local processors are controlled by a central processor that determines beam direction, performs carrier recovery and error detection, and distributes control and timing information used by the local processors in performing the distributed signal processing and beamforming functions. In effect, a phased array system with distributed architecture operates in a computationally efficient manner by parallelizing a large portion of signal processing operations, thereby achieving speedup that increases as an exponential factor of the number of local processors that are used.

BRIEF SUMMARY

The present disclosure provides techniques, methodologies and designs for implementing a phased array communication system which includes a plurality of antenna elements that simultaneously receive multiple signals. Each of the antenna elements downconverts the received signals to an intermediate frequency, digitizes the received signals, channelizes each of the received signals, wherein channelizing segments each of the received signals into multiple complex signal representations, phase shifts each of the multiple complex signal representations. With respect to each of the signals the antenna elements form multiple channelized beams by adding the complex signal representations such that complex signal representations that are representations of a same signal and that correspond to a same channel are added together, and synthesize a beam with respect to each of the signals, wherein each of the synthesized beams is synthesized from at least two of the channelized beams. Synthesizing is done using an Inverse Fourier Transform and a polyphase filter, and includes upsampling each of the signals, and digitizing the received signals includes generating complex samples of each of the received signals.

This disclosure also describes an apparatus for simultaneously receiving one or more signals and performing beamforming with respect to received signals, the apparatus comprising multiple antenna elements configured to simultaneously receive multiple signals, wherein each of the elements includes a component configured to downconvert the received signals to an intermediate frequency, a conversion component configured to digitize the received signals, a channelizing component configured to channelize each of the received signals, wherein channelizing segments each of the received signals into multiple complex signal representations, a component configured to phase shift each of the multiple complex signal representations, a central processor configured to form multiple channelized beams by adding the complex signal representations such that complex signal representations that are representations of a same signal and that correspond to a same channel are added together, and synthesize a beam with respect to each of the signals, wherein each of the synthesized beams is synthesized from at least two of the channelized beams.

BRIEF DESCRIPTION OF THE DRAWINGS

Aspects of the disclosure are illustrated by way of example. In the accompanying figures, like reference numbers indicate similar elements, and:

FIG. 1A depicts transmitting elements, and FIG. 1B depicts receiving elements.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

This disclosure describes a computationally efficient phased array system with distributed architecture for signal processing and beam forming. The system uses channelization, channelized beamforming, and beam synthesis to provide efficient beamforming and processing of multiple directional signals across a broadband frequency spectrum. The system architecture, including the design features that implement the channelization and synthesis scheme, are designed for flexible coverage of the frequency spectrum. This flexibility enables the system to simultaneously process directional signals even when those signals occupy irregularly spaced or overlapping subbands of different bandwidth, such as those frequently used by military and space communications systems. Thus, the phased array system can simultaneously form beams for an arbitrary number of signals, even when each signal is characterized by an arbitrary bandwidth and center frequency.

Figure 1A:
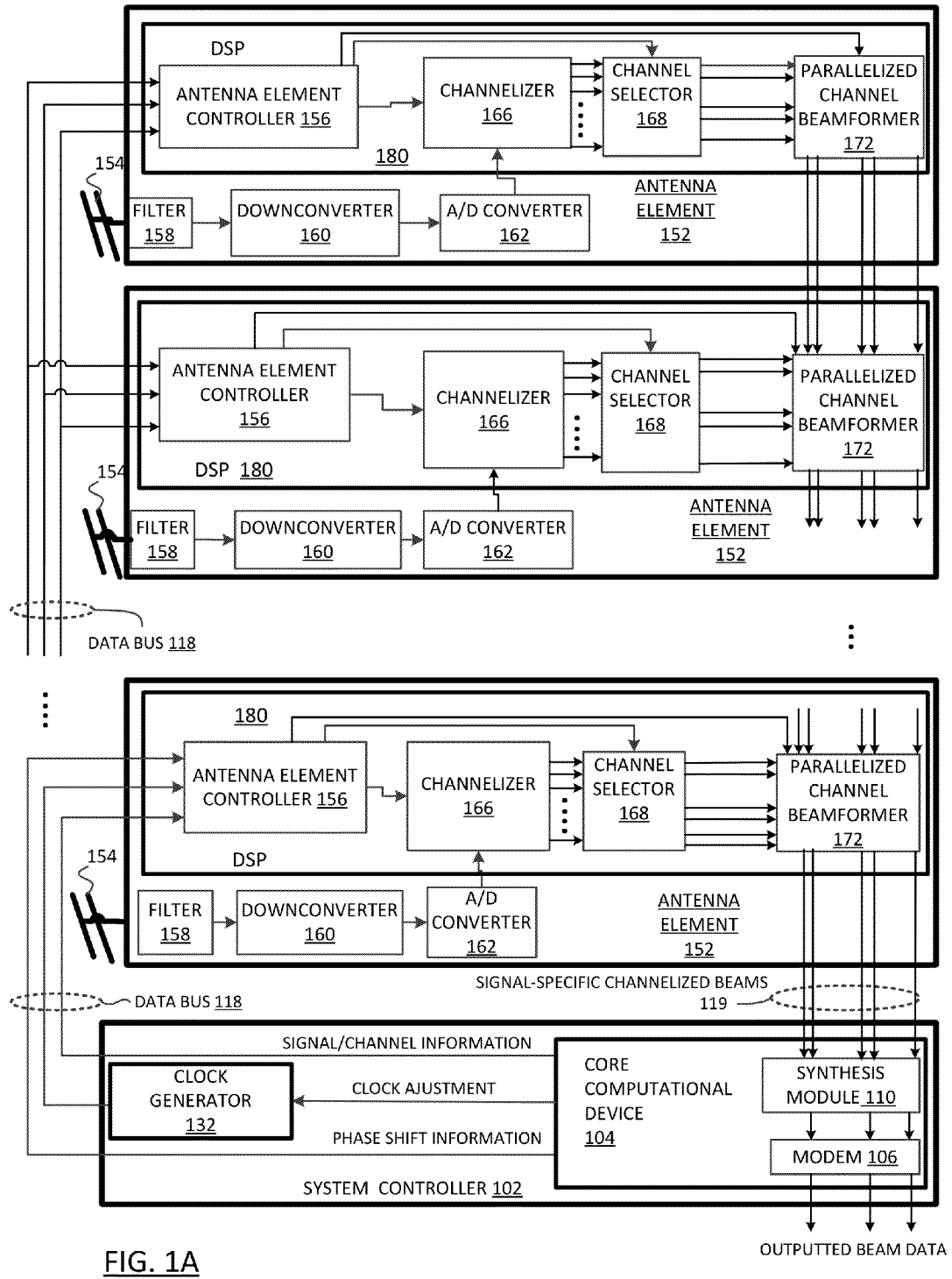
FIGS. 1A and 1B illustrate certain aspects of an example phased array system in which certain techniques of the present disclosure are implemented.
Figure 1B:
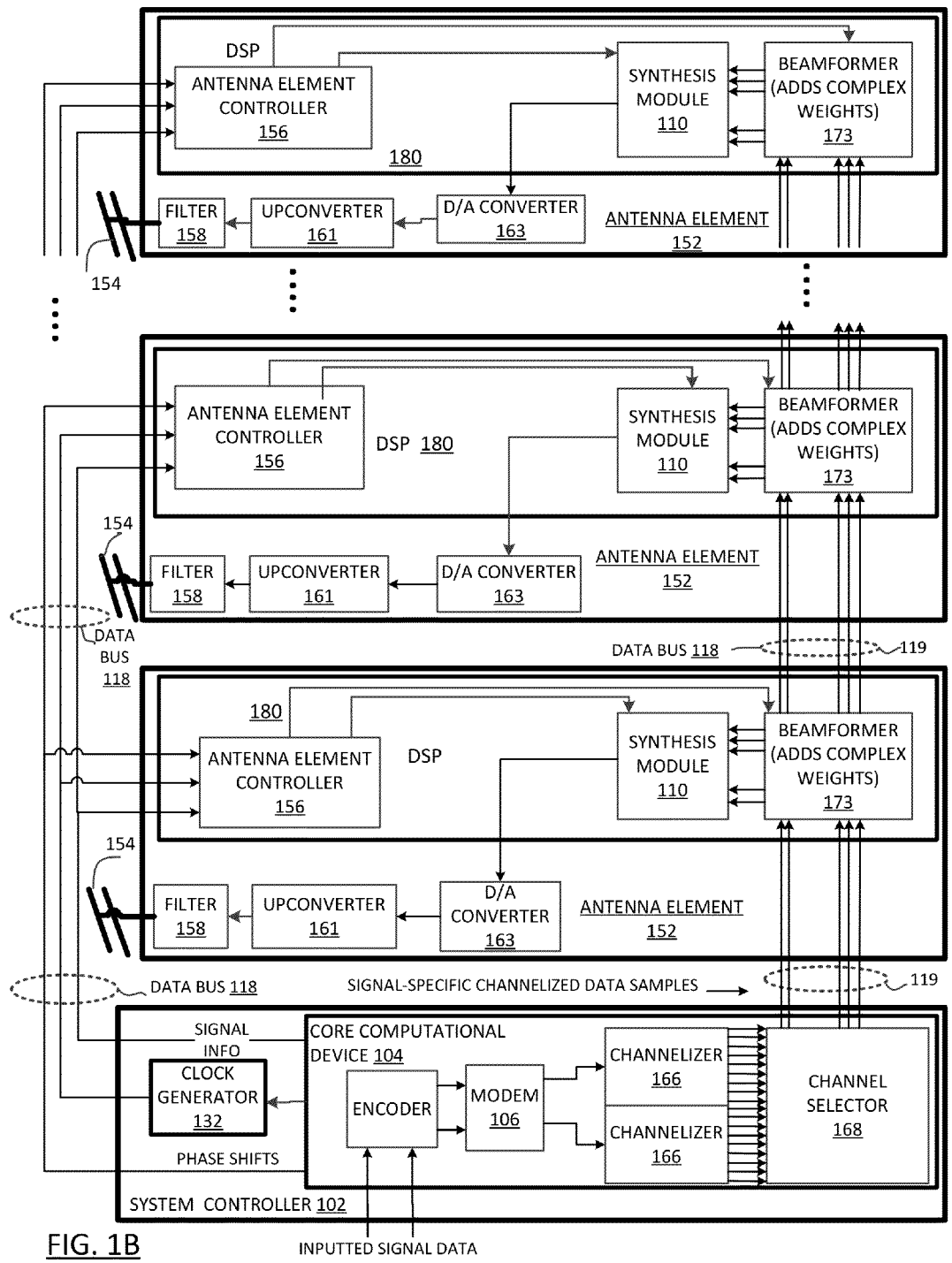

FIG. 1A and FIG. 1B provide a generalized illustration of certain aspects of an example embodiment of the phased array system 100 disclosed herein. FIG. 1A is illustrated from the viewpoint of the phased array system 100 receiver components. FIG. 1B is illustrated from the viewpoint of the phased array system 100 transmit components. As depicted in FIG. 1A, the phased array system 100 includes a system controller 102 communicatively coupled, directly or indirectly, to multiple antenna elements 152. Each antenna element 152 includes an antenna 154, RF circuitry, and a digital signal processor (DSP) 180. The RF circuitry includes an analog bandpass filter 158, a downconverter 160, and an analog-to-digital converter (A/D converter) 162. The digital signal processors 180 are implemented using a field programmable gate array (FPGA), DSP chip or other programmable digital processing device. The DSPs 180 are encoded to perform distributed processing with respect to signals that are transmitted and received at the antennas 154 of their respective antenna elements 152.

During receiver processing, the signal processing performed by the DSPs 180 is used to form one or more channelized beams for each signal received by the phased array system 100. As will be explained in greater detail herein, each channelized beam is the result of beamforming performed with respect to only the portion of received signal spectral energy within a particular predefined range of frequencies (a channel). When a signal contains spectral components within multiple channels, the DSP 180 processing is used to form channelized beams for each channel containing spectral energy. However, in some cases, a single channelized beam may contain all of the spectral content of a signal. This occurs when the entire frequency spectrum of a received signal is within a single channel. Channelized beams are formed collectively based on signal energy received at multiple antenna array elements 152, and the results of sampling and sample processing and manipulation performed locally by the DSPs 180 within the antenna array elements 152.

Each DSP 180 includes an antenna element controller 156. Each antenna element controller 156 generates local control signals to modify the signal processing operations performed by modules within the DSP 180.

As will be described in greater detail below, the system controller 102 provides systemwide control and synchronization of the distributed signal processing and channelized beamforming operations performed at the various antenna elements 152. For this purpose, the system controller 102 uses a clock signal that is distributed to each of the antenna element controllers 156. The system controller 102 generates the clock signal using a variable frequency clock generator 132. At each antenna element 152, the antenna element controller 156 uses the clock signal to locally control sample timing and other distributed signal processing and beamforming operations.

The system controller 102 includes a core computing device 104. The core computing device 104 is a field programmable gate array or other similar computational apparatus. As will be explained in greater detail in later paragraphs, the core computing device 104 performs several signal processing tasks. For example, in certain situations, the core computing device 104 performs beam/channel synthesis to assemble received signal beams. In this process, each such signal beam is a composite beam assembled from multiple channelized beams formed by the antenna elements 152.

By using parallelized computing, the core computing device 104 can synthesize multiple beams at a single time. Furthermore, the core computing device 104 is provided with code to perform synthesis dynamically so that any beam signal can be synthesized from any combination of channelized beams, as appropriate based on the signal bandwidth and spectral characteristics. Because synthesis processing is parallelized, the synthesis of many beams may be performed simultaneously, regardless of the channelized beams involved in those processes. Beam/channel synthesis will be discussed in greater detail in subsequent paragraphs.

Within the core computing device 104, one processor module serves as a modem 106, while another processor module serves as a encoder/decoder (not shown). The modem 106 demodulates received signals by converting modulation symbols to bits, and provides modulation functionality for each signal that the phased array system 100 transmits. The modem 106 is configured to handle streams of modulation symbols or bits for multiple signals simultaneously.

For each received signal, the bitstream outputted by the modem 106 is decoded by the encoder/decoder to produce output data. When the phased array system 100 transmits a signal, the encoder/decoder encodes inputted data and provides the data to the modem 106. The modem 106 receives the encoded bitstream and converts it to modulation symbols prescribed by a designated modulation scheme.

The system controller 102 provides the channel selector modules 168 with information regarding the channels that coincide with signals being received, and updates this information each time the combination of received signals changes.

Various data buses 118, 119 connect the control unit 102 to the various antenna elements 152. These data buses link the antenna elements 152 in a daisy chain topology and can be used to communicate information from the system controller 102 to the antenna elements 152 and vice versa. One such data bus is depicted at 118. The data bus 118 is shown as being used by the system controller 102 to transmit timing, synchronization and signal processing and beamforming control information to each of the antenna element controllers 156. The daisy chain topology of the data buses 118, 119 enables beamforming information to be communicated from one antenna element 152 to the next in the process of channelized beamforming.

For example, data bus 119 is used to assemble channelized beamformed signals through incremental communication of channelized beamforming data from one antenna element 102 to the next. In FIG. 1A, the system controller 102 is shown as connected to one end of data bus 119. In this way, the system controller 102 is able to receive the channelized beams formed for each received signal.

The antenna element controllers 156 also perform system monitoring, and relay control, timing and synchronization information to the system controller 102 and adjacent antenna element controllers 156. For the purposes of communicating and relaying control, timing and synchronization information, the antenna element controllers 156 may be programmed to utilize a multiplexing capability that enables them to transmit all such information on one daisy chained data bus 118. Alternatively, the phased array system 100 may incorporate multiple data buses 118, 119 for the communication of control, timing and synchronization information throughout the phased array system 100.

The antenna elements 152 are modular, and all antenna elements 152 in phased array system 100 perform the same functions in the same manner. For this reason, this disclosure will generally describe components and operations of the antenna elements 152 by referencing a single antenna element 152. However, despite referring to the components and operations of a single antenna element 152, the description should be understood as being applicable to all antenna elements 152 in the phased array system 100.

At an antenna element 152, the antenna 154 detects electromagnetic energy, including energy associated with an arbitrary number of signals of interest at any one time. The signals occupy subbands of arbitrary bandwidth and arbitrary center frequency, and may be received from any direction.

The phased array system 100 determines the spectral and directional characteristics of signals of interest, and uses this information to control the channelized beamforming and channel/beam synthesis processing that it performs. The spectral and/or directional characteristics of any number of the signals may be known to the central control unit 102 prior to being received. For example, the core computing device 104 may be hard encoded with a list of signals and their corresponding subbands, center frequencies and directionality, or may process a list of such signals that is manually updated when a change to the list is necessary. Alternatively, the antenna control unit 102 may periodically command the antenna elements 152 to scan for signals. Scanning in this way may involve using well-known phased array scanning techniques that enable arbitrary signals to be detected and their frequency and directional characteristics to be calculated.

The analog bandpass filter 158 in the antenna element 152 is configured to reject energy at frequencies that are not within the operational frequency band of the phased array system 100. Received signal energy at the output of the bandpass filter 158 is amplified (amplifier not shown) and then downconverted to an intermediate frequency by downconverter 160. The downconversion process creates 2 complex (I-Q) intermediate frequency (IF) signals.

The downconverter 160 includes a splitter, a phase-delay component, a voltage controlled oscillator operated within a phase locked loop, and a mixing unit (neither of which are shown). The voltage controlled oscillator produces an oscillation signal that is split by the splitter. The two oscillation signals resulting from this process are inputted to a phase-delay component, which outputs two sinusoids of equal frequency which have a 90 degree phase difference.

The received signal energy is also split. One of the split versions is inputted to the mixing unit, where it is mixed with one of the two oscillation signals outputted by the phase-delay compent. Similarly, the other split version is mixed with the other one of the two oscillation signals outputted by the phase delay component.

The I-Q IF signals are then both inputted to the A/D converter 162. The A/D converter 162 samples both IF components, and converts each sample to a digital representation. The I and Q sample streams generated by the A/D converter 162 are inputted to the DSP 180 so that they may be processed as part of the channelized beamforming process. The DSP 180 fragments the inputted series of samples into frequency channels, each having a lower sample rate than the inputted time series. Each channel is a stream of complex samples centered at zero frequency, and contains data from within a respective range of frequencies within the operating band.

Specifically, the DSP 180 fragments the signals by applying a channelizer 166 to channelize the time series of complex digital samples outputted by the A/D converter 162. The channelizer 166 may be implemented using any suitable combination of the many known signal processing techniques for channelizing a complex signal. One such technique involves a commutator, polyphase filter bank, various buffering components, and a DFT filter bank (neither of which are shown). Many other alternative techniques are available, and the phased array system 100 may be designed with channelizers 166 which incorporate any such digital channelization technique.

The channels are defined according to the same channelization scheme from one antenna element controller 156 to the next in the phased array system 100. The channels collectively cover the entire frequency band in which the phased array system 100 is operated. Normally, it is preferable for the channels to be defined so that the channel center frequencies are equally spaced. For example, when the phased array system 100 is to be operated throughout a 200 MHz frequency band, 40 channels may be used to cover the band in such a way that each channel covers a band portion that is 5 MHz wide. Throughout this disclosure, the description of phased array system 100 will assume that the system will be operated throughout such a 200 MHz band, and that the system incorporates a channelization scheme involving 40 channels, each having 5 MHz of bandwidth.

However, it shall be understood that these parameters have been assumed as an explanatory reference only. Such parameters constitute only one example of a channelization scheme that may be used within phased array systems 100 within the scope of this disclosure, and their mention herein shall not be interpreted to represent or imply any limitation effective upon the scope or coverage of this disclosure. Additionally, although the channelization scheme defines channels to be equally spaced with equal bandwidth, this should not be understood to mean that the phased array system 100 is limited to receiving or transmitting signals with bandwidths that coincide with the channel bandwidths. Rather, the core computing device 104 performs channel synthesis that enables beamforming and beamforming of signals of arbitrary bandwidth and arbitrary center frequency, including signals having larger bandwidth than individual channels.

FIG. 1B provides phased array system 100 components involved in transmitting signals. The components illustrated in FIG. 1B perform what is essentially the reverse of the process depicted in FIG. 1A. For this reason, FIG. 1B shows a beamforming module 173, D/A converter 163 and an upconverter 161, neither of which is depicted in FIG. 1A. At each antenna element, the beamforming module 173 phase shifts and weights the channelized sample streams, in a manner similar to beamforming module 172 (the operations of beamforming module 172 will be described in detail in later paragraphs). The phase shifting and weighting can be done together through multiplication by a complex number. The D/A converter 163 is provided with digital sample data, and converts the data to an analog signal. The upconverter 161 then converts the analog signal to an RF frequency, for transmission. Several other components in FIG. 1B are depicted in FIG. 1A, and for that reason, will not be described again.

Figure 2:
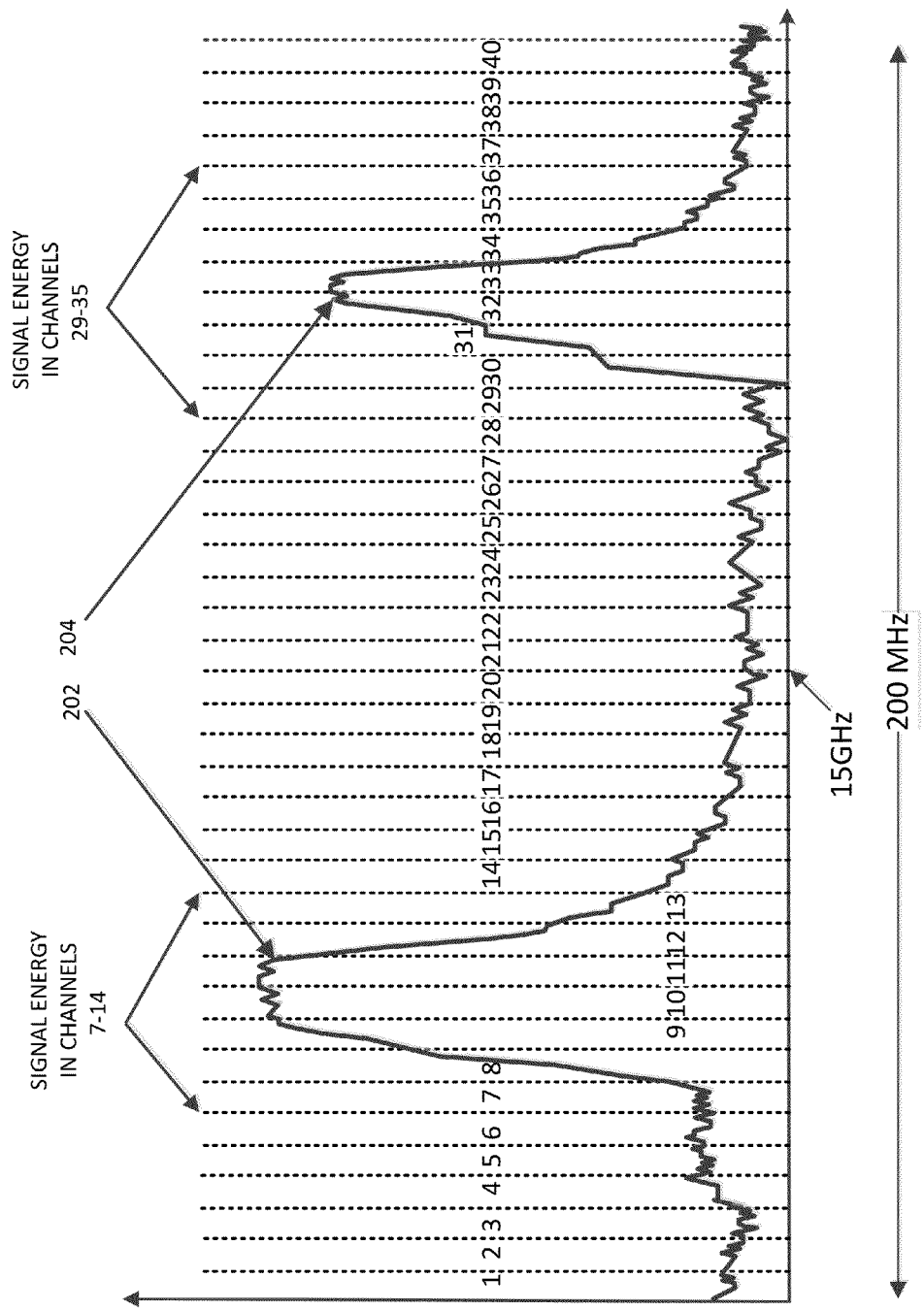
FIG. 2 illustrate an example channelization scheme and how certain signals spectrally overlap with channels defined under the channelization scheme.

FIG. 2 is provided to demonstrate one manner of defining a channelization scheme, as explained by graphically depicting received signal energy within a 200 MHz band of operations. FIG. 2 depicts the frequency spectrum of energy received at an antenna 154 in the phased array system 100. FIG. 2 is focused on a 200 MHz operating band centered at 15 GHz and does not display any frequencies outside of this band. In addition to displaying the received spectrum, FIG. 2 shows how the channelization scheme partitions this 200 MHz band into 40 channels of equal bandwidth, such that each channel is 5 MHz wide.

FIG. 2 further depicts the presence of two distinct signals amongst the received energy in the 200 MHz band. For example, signal 202 occupies a bandwidth of approximately 40 MHz, centered approximately 14.95 GHz, and signal 204 occupies a bandwidth of approximately 35 MHz, centered approximately at 15.06 GHz.

Based on the channelization scheme shown in FIG. 2, signal 202 spectrally overlaps channels 7-14. Thus, to form a beam with respect to a signal such as signal 202, phased array system 100 forms separate channelized beams with respect to channels 7-14. At the system controller 102, a larger composite beam that includes all the information content of signal 202 is then synthesized from these eight channelized beams.

Also, FIG. 2 shows that signal 204 spectrally overlaps with channels 29-35. Thus, to form a beam with respect to a signal such as signal 204, phased array system 100 forms separate channelized beams with respect to channels 29-35. At the system controller 102, a larger composite beam that includes all the data from signal 204 is then synthesized from these four channelized beams.

As described previously, each channelizer 166 may incorporate a polyphase filter bank, followed by a buffer and DFT block that yields the complex channelized samples. In this case, the number of filter paths and DFT points are preferably set in light of the sampling rate of the A/D converter 162 in the signal path prior to the channelizer 166 input, the number of channels provided by the channelization scheme, and the channel bandwidths. For example, when the phased array system 100 is operated across a 200 MHz band as described above, the sampling frequency employed at each A/D converter 162 must satisfy the Nyquist sampling criteria in order to reliably demodulate received data. Because the A/D converters 162 employ complex sampling, the Nyquist criteria is satisfied by a 200 MHz sampling frequency. However, for a variety of reasons, it may be preferable to sample at roughly 15-25% above the Nyquist sampling rate. For example, a 240 MHz sampling frequency may be used.

In this case, in order for the aforementioned channelization scheme to be incorporated (40 channels spanning a 200 MHz band, each channel 5 MHz wide), a preferred channelizer 166 design may include a 48-path polyphase filter bank and a 48-point DFT (i.e 240 MHz sampling rate divided by 5 MHz channel width). However, in this case, the 48-point DFT channelizes the 200 MHz band of frequencies, as well as two additional 20 MHZ bands on both sides of 200 MHz band. For this reason, the first four and last four channelizer 166 outputs are not used by the phased array system 100.

The DFT is periodically calculated at a periodic time interval equal to the duration of 24 sample periods occurring at the A/D converter 162. In this way, each polyphase filter output is processed once in each of two consecutive computations of the 48-point DFT. As a result of each DFT input being used in two consecutive DFT iterations, the sampling rate required to satisfy the Nyquist sampling frequency criteria is effectively reduced by a factor of two.

Within the DSP 180, a channel selector module 168 is used to select the appropriate channelized sample streams used for beamforming. The channel selector module 168 selects sample streams corresponding to channels that are spectrally overlapped by a signal of interest. For example, in the presence of signals 202 and 204 shown in FIG. 2, the channel selector module 168 selects the sample streams corresponding to channels 7-14 and 29-35 at the output of the DFT block. In this way, the phased array system 100 eliminates channelized samples that do not include data from at least one signal of interest. Additionally, it is important to note that at each antenna element 152, selected sample streams are processed in parallel subsequent to being output by the channelizer 166.

The channel selector 168 continuously provides the beamformer 172 with the channelized sample streams relevant to signals of interest. The beamformer 172 then applies a unique phase shift and/or complex weight to the complex samples in each such stream.

The core computing device 104 computes all such phase shifts used in the phased array system 100, and communicates the phase shifts to the antenna element controllers 156 so that they may be used by the beamformers 172. For any given signal being processed at a given antenna element 152, the phase shifts are based on the signal directionality, the respective antenna 154 location in the phased array system 100, and the center frequency of the channel to which the complex samples correspond. When a received signal spectrally overlaps multiple channels, phase shifts are separately calculated for each stream of channel samples because each of the channels relates to a different portion of the frequency spectrum.

Frequently, a given channel will be spectrally overlapped by multiple simultaneously received signals. In the case of a channel that is spectrally overlapped in this way, the channelized sample stream includes data from each of the overlapping signals. The channel selectors 168 select and then split the sample stream to form two identical channelized sample streams. The splitting enables one sample stream to be used in the channelized beamforming done with respect to the first one of the overlapping signals, and the other stream to be used in the channelized beamforming done with respect to the other one of the overlapping signals. If there are additional overlapping signals, additional splitting is performed so that there is a channelized sample stream for each signal. The beamformer 172 applies a unique phase shift to each of these sample streams based on the directionality of the respective signal, the configuration of antennas 154 in the phased array system 100, and the center frequency of the channel that the sample stream corresponds to.

When channelized beamforming is performed for a given channel, each of the beamformers 172 involved in forming the beam contributes phase shifted channel samples to the beam. In this process, the phase-shifted channel samples are incrementally summed from one beamformer 172 to the next, across the range of antenna elements 152 used to form the beam. In the summation process, the unique phases shifts cause coherent addition of the various sample components attributable to the signal of interest.

When a signal occupies a subband that overlaps more than one channel, beamforming is done with respect to each of the relevant channels individually. The process of summing channel samples is done in a parallel fashion, such that the sum of the samples from one channel may be calculated at the same time as the sum of samples from another channel is being calculated. Moreover, when multiple signals are being received, channelized beamforming with respect to the relevant channels is performed in parallel such that any number of channelized beams may be formed at a given time.

Figure 3A:
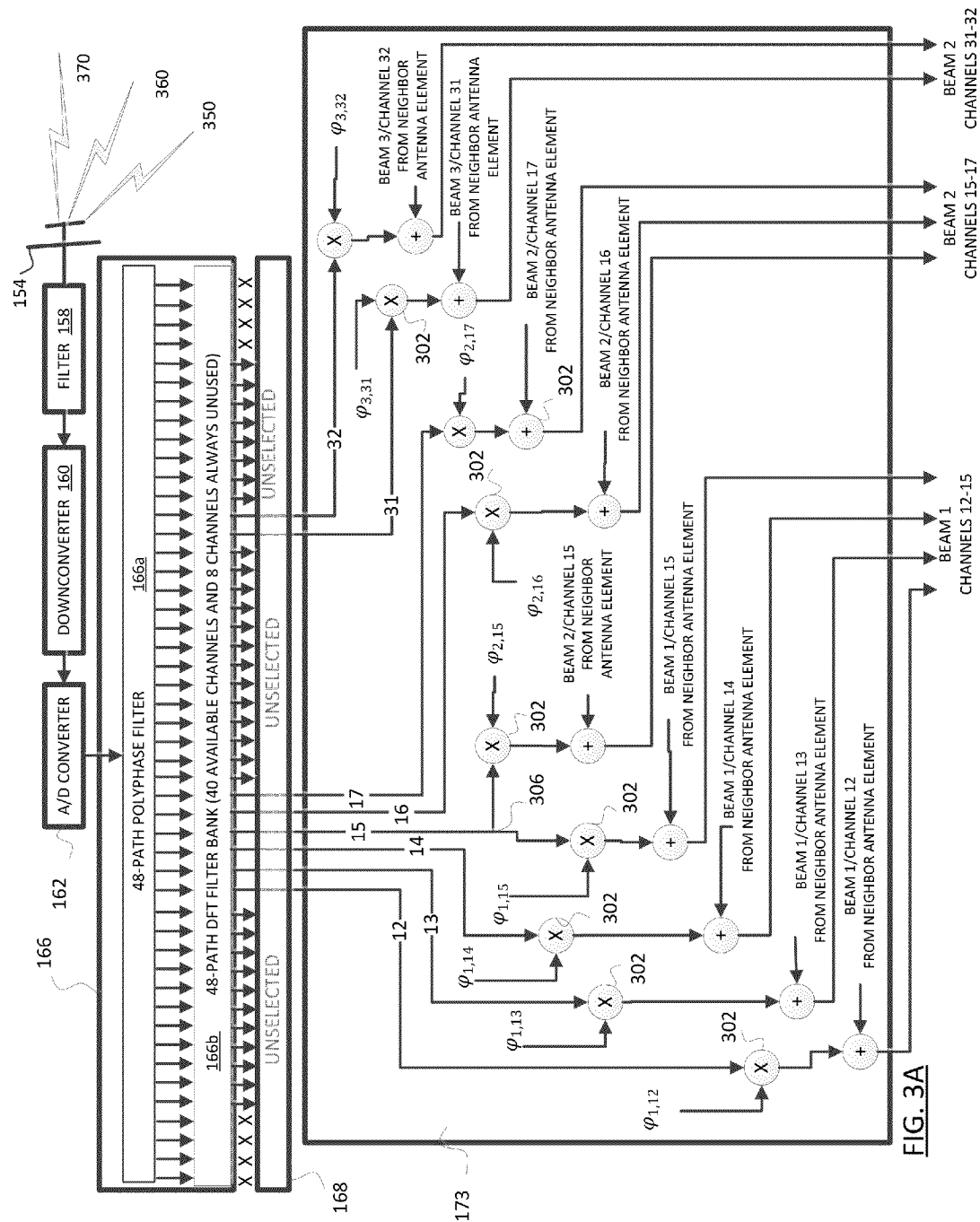
FIG. 3A illustrates example multi-signal beamforming operations involving a channelizer, channel selection module, and beamformer within an antenna element of the phased array system described herein.

FIG. 3A is a focused view of a single antenna element 152 and some of the signal processing operations performed therein. FIG. 3A is intended to show how the channelizer 166 at an antenna element 152 provides channelized sample streams, and how channelized sample streams that are relevant to signals of interest are selected and processed while other channelized sample streams are not utilized. FIG. 3 depicts the antenna 154, analog filter 156, downconverter 160 and A/D converter 162 used to process received energy. Additionally, FIG. 3 shows a channelizer 166 incorporating a 48-path polyphase filter 166a and a 48-point DFT 166b, in accordance with one of the example channelizer architectures described earlier in this disclosure.

The complex sample stream output of the A/D converter 162 is provided to the polyphase filter 166a. The polyphase filter 166a provides 48 distinct output paths, with the sample rate at each output path being 24 times less than the sample rate at the output of the A/D converter 162. These outputs are buffered (not shown) and then provided to the 48-point DFT block 166b in such a way that the DFT 166b receives blocks of 48-input points once for every 24 samples that are inputted to the polyphase filter 166a.

At the DFT block 166b, the 48-point DFT is calculated for each block of 48 samples. DFT bins 1-4 and 45-48 are unused because the channelization scheme involves only 40 channels rather than 48. However, DFT bins 5-44 cover the 200 MHz band of operations. In this way, DFT bin 5 yields the channelized samples for the lowest frequency channel (channel 1) in the band of operations, DFT bin 6 yields the samples for the next channel (channel 2), and so on.

As shown at 350, 360 and 370 there are three signals of interest being received by the phased array system 100 during the operations of the antenna element 152. Signal 350 spectrally overlaps channels 12, 13, 14, and 15. Signal, 360 spectrally overlaps channels 15, 16 and 17. Also, signal 370 spectrally overlaps channel 31 and 32.

Thus, channel selection module 168 selects the sample streams associated with each of these channels, and provides the sample streams to the beamformer 172. The beamformer 172 performs channelized beamforming on each of the channelized sample streams provided in this way. In each case, the channelized beamforming process involves phase shifting the samples in the channelized sample stream, as shown at 302. The samples may also be weighted to eliminate antenna side lobes from interfering with the signals. Phase shifting and weighting may be accomplished by multiplying each channelized sample stream by an appropriate complex number.

After phase shifting, the beamformer 172 receives a running sum of phase-shifted channelized samples provided by the beamformers 172 at other antenna elements 152, and adds the local phase-shifted samples to the running sum. The beamformer then forwards the new sum to the beamformer 172 at the nearest neighboring antenna element 152 in the direction of the core computing device 104.

That neighboring beamformer 172 executes the same process depicted in FIG. 3, but applies different phase shifts that compensate for its particular position in the phased array system 100. The neighboring beamformer 172 adds its phased shifted samples to the running sum, and provides the running sum to the beamformer 172 of the next antenna element 152 on the daisy-chained data bus 118 (not shown in FIG. 3). For each selected channel (12, 13, 14, 15 (beam 1), 15 (beam 2), 16, 17, 30 and 31), this process continues incrementally along the daisy chain until the respective running sum is received at the system controller 102, at which point the running sum is a channelized beam.

In FIG. 3A, both signal 350 and 360 are shown as spectrally overlapping channel 15. For this reason, the channel selector 168 duplicates the sample stream of channel 15, as shown at 306. One copy of the sample stream is used in the beamforming performed for signal 350, and one copy is used in the beamforming performed for signal 360. Because signal 350 and 360 are received from different directions, a different phase shift is applied to the two versions of the channel 15 sample stream that result from the splitting.

Figure 3B:
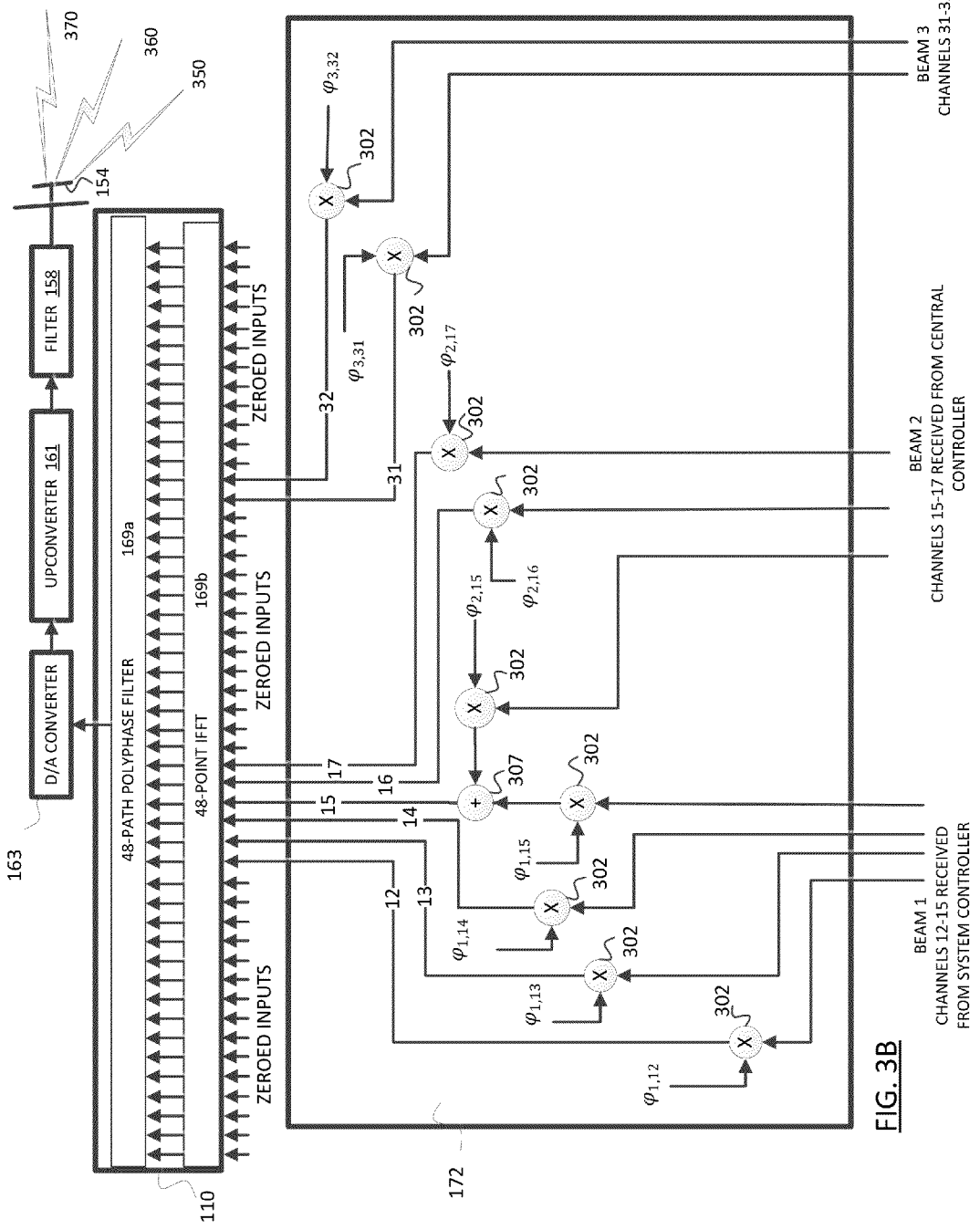
FIG. 3B illustrates example multi-signal beamforming operations involving components within an antenna element of the phased array system described herein.

FIG. 3B depicts beamforming operations performed at an antenna element 152 for simultaneously transmitting signals 350, 360 and 370. As illustrated in FIG. 3B, channelized components of signals 350, 360 and 370 are distributed by the system controller, and are received at the antenna element 152 beamforming modules 173. Two versions of the channel 15 component are received because both signal 350 and signal 360 overlap channel 15. At 302, each channel component is phase shifted. The phase shifting is a function of signal center frequency, direction of transmission, and location of the antenna element.

The two versions of the channel 15 component are summed together, at 307. Subsequently, each component is inputted to a 48-point IFFT filter bank. The 48 output bins of the IFFT are inputted to a 48-path polyphase filter 169a. The polyphase filter 169a outputs a single stream of complex samples which includes information from signals 350, 360 and 370. The sample stream is converted to analog at 163, upconverted at 161, and filtered at 158, prior to being transmitted at 154.

Figure 4:
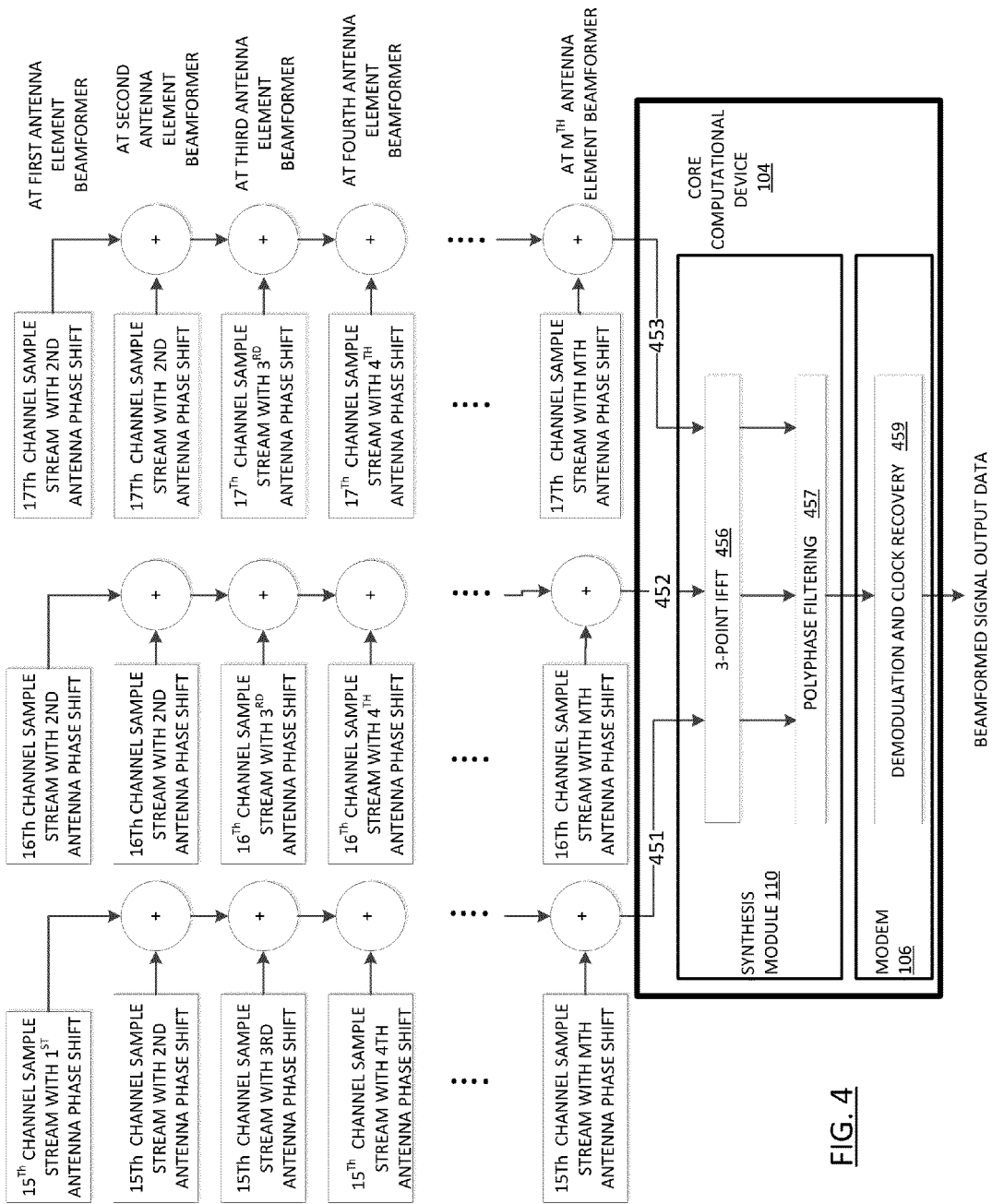
FIG. 4 illustrates example operations involved in forming channelized beams and processing of the channelized beams by a synthesis module within a central processor.

FIG. 4 is a diagram that partially depicts beamformer 172 operations performed at multiple antenna elements 152 to form 3 channelized beams in the process of applying beamforming to received signal 360. FIG. 4 only depicts the portion of channelized beamforming that involves the summing operation performed by the beamformers 172 within the antenna elements 152. Signal processing operations that are performed at the antenna elements 152 in order to obtain channelized and phase-shifted samples are not shown.

As was mentioned earlier, signal 360 includes spectral energy within channels 15, 16 and 17. Thus, as depicted in FIG. 4, antenna elements 152 in the phased array system 100 contribute to the formation of three channelized beams 451, 452, and 453 during the processing of signal 360. Channelized beam 451 includes the signal energy within channel 15, while channel 452 and 453 include the signal energy within channels 16 and 17, respectively. Each channelized beam 451, 452, 453 is formed by the channelized and phased shifted sample contributions of the antenna elements 152 being incrementally summed through use of the daisy chain data bus 118.

Each time a summing operation occurs at an antenna element 152, the newly calculated sum is communicated on the data bus 119, in the direction of the system controller 102. The newly calculated sum is received at a neighboring antenna element 152, which adds additional channelized and phase shifted sample contributions resulting from the processing there. For channels 15, 16, and 17, this process continues much like an assembly line, such that channelized beams 451, 452 and 453 are received at the system controller 102.

FIG. 4 also depicts example beam synthesis operations performed at core computing device 104. In FIG. 4, the beam synthesis operations are shown as being used to synthesize a beam for signal 360. The beam is synthesized from channelized beams 451, 452 and 453.

In phased array system 100, the beam synthesis processing is executed by the synthesis module 110 within the system controller 102, and may involve a combination of many operations, such as, but not limited to, Nyquist filtering, zero padding, frequency translation or aliasing, circular buffering, phase rotation alignment, repeated IFFT calculation, polyphase filtering, commutation and output buffering. The output of the synthesis is a time series of samples that constitute a beam formed with respect to a signal that was previously segmented into its channelized components. The time series of samples satisfies the Nyquist sampling criteria for the bandwidth of the previously-segmented signal.

In FIG. 4, the representation of the synthesis processing performed by the synthesis module 110 should be understood as being generalized, and only illustrative of some of the operations that may be performed in the beam synthesis process. Specific beam synthesis processing operations and parameters should be chosen for use as necessary, and in view of the processing capabilities of core computing device 104, the number of beams being synthesized, the numbers and combinations of channelized beams involved in the synthesis, and the sampling rates, channelization scheme and other signal processing parameters within the phased array system 100.

Although only one beam is depicted as being synthesized in FIG. 4, the synthesis module 110 is configured to perform parallelized synthesis operations so that each signal received at a given time is independently and simultaneously synthesized. For each such signal, the synthesis module 110 receives channelized beam samples in parallel, and combines the beams to form a larger bandwidth beam, which is then upsampled.

Each time the IFFT is performed, three sample points are provided to a polyphase filter, as depicted at 457. The three polyphase filter outputs are the next three beam samples, and are demodulated by the modem 106, as depicted at 459. Clock recovery is also performed, as depicted at 459.

Figure 5:
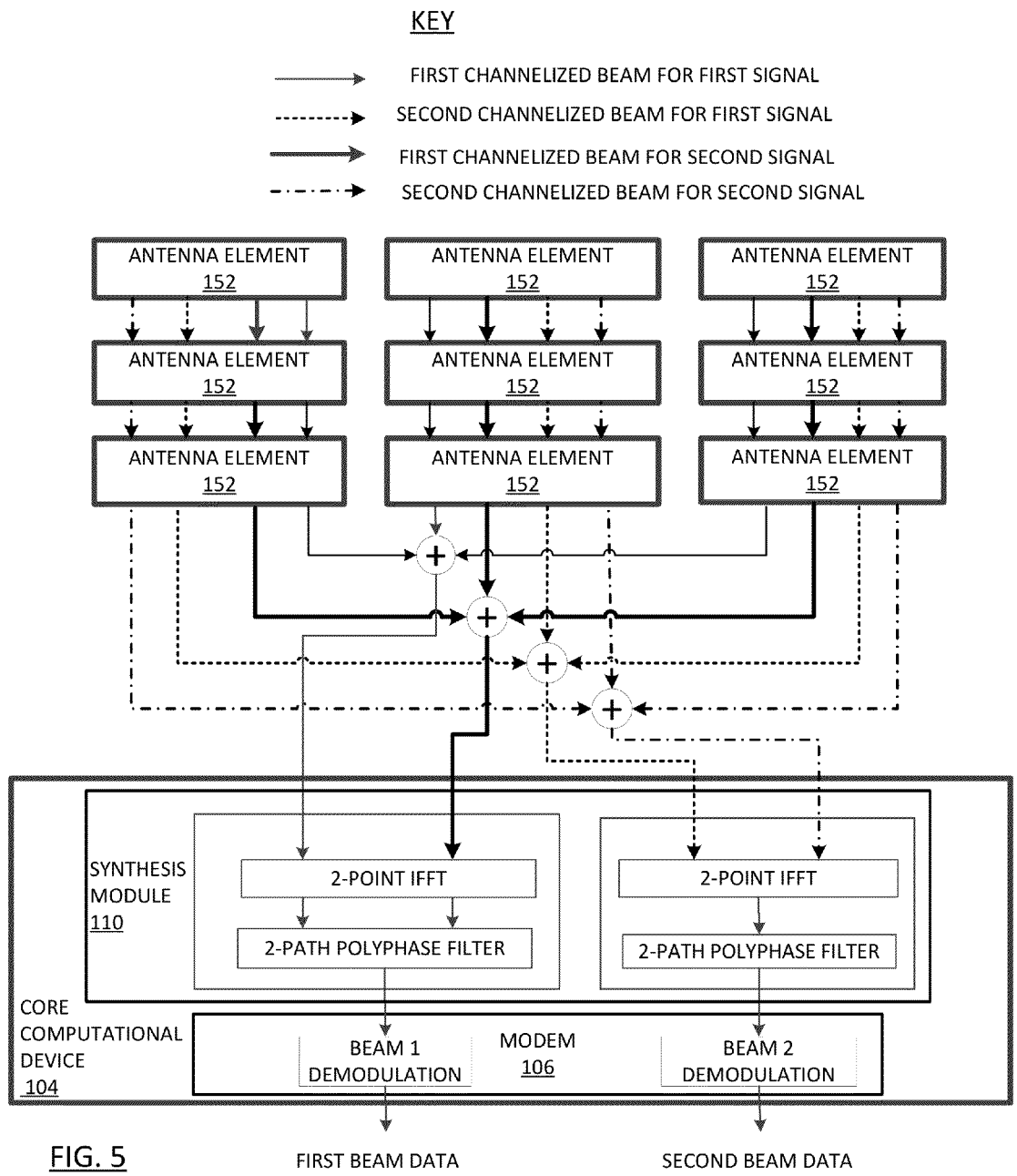
FIG. 5 illustrates example parallelized operations for simultaneously synthesizing multiple beams from channelized beams.

FIG. 5 provides a generalized illustration of parallelized synthesis of two beams. As depicted in FIG. 5, the process of synthesizing the two beams occurs simultaneously within the synthesis module 110, and involves the parallel processing capabilities of the core computing device 104. As shown in FIG. 5, antenna elements 152 receive two signals, each of which spectrally overlaps two channels. For this reason, the beamformers 172 within the antenna elements 152 collectively and continuously form two channelized beams with respect to each of the received signals (not explicitly shown). The four channelized beams are provided to the core computing device 104.

Within the core computing device 104, the synthesis module 110 performs parallel processing to synthesize a distinct beam with respect to each of the two received signals. Thus, two beams are each simultaneously synthesized from two channelized beams. Because each beam is synthesized from two channelized beams, each instance of beam synthesis involves a 2-point IFFT computation for calculating samples to be inputted to a 2-path polyphase filter. For each beam, the synthesis processing yields a stream of samples. Both streams of samples are provided to the modem, which performs parallelized demodulation of the two signals.

Figure 6:
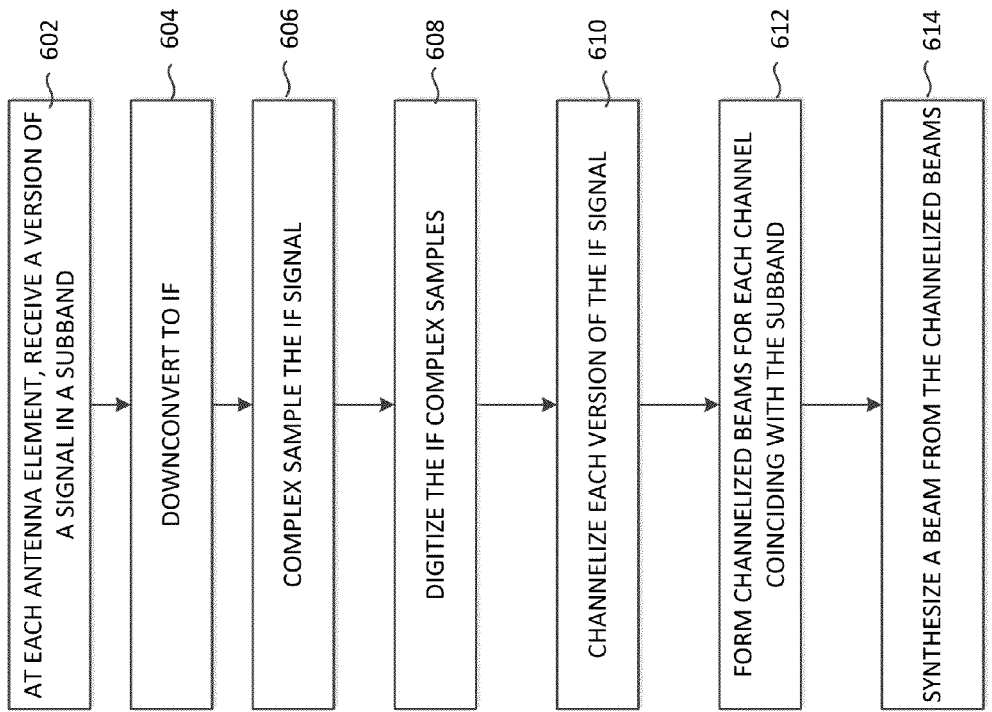
FIG. 6 is a flow diagram depicting example beamforming operations.

FIG. 6 depicts example received signal operations performed by the phased array system 100. The operations are depicted with respect to a single signal being received, but may be used by the phased array system 100 to form beams with respect to any number of signals being received, regardless of the portion of the operating frequency band which the signals occupy. At 602, each antenna element 152 receives a version of a signal that occupies a given frequency subband. At 604, the received signal each antenna element 152 is downconverted to an intermediate frequency (IF). At 606, I-Q sampling techniques are used to obtain complex samples of each downcoverted version of the signal. At 608, the complex samples are digitized. At 610, the various digitized sample streams are channelized.

At 610, channelized beams are formed with respect to each channel that is spectrally overlapped by the signal. At 612, a beam is synthesized from the various channelized beams.

Specific details are given in the above description to provide a thorough understanding of the various embodiments of the described methods, techniques and systems. However, it is understood that certain such embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

The invention claimed is:

1. A method for simultaneously receiving and beamforming multiple signals at a phased array system that includes multiple antenna elements, the method comprising:
receiving a radio frequency (RF) waveform at each of the antenna elements, the RF waveform including the multiple signals;
performing the following operations at each of the antenna elements:
generating a downconverted waveform by downconverting the RF waveform to an intermediate center frequency;
obtaining a digital sample stream by digitizing the downcoverted waveform;
channelizing the digital sample stream, wherein channelizing includes segmenting the digital sample stream into multiple complex channelized representations of the digital sample stream; and
obtaining channelized beam components by phase shifting each of the multiple channelized representations;
forming multiple channelized beams with respect to each of the signals by adding together channelized beam components obtained at different antenna elements such that channelized beam components that correspond to a same channel are added together;
beamforming each of the signals by synthesizing at least two of the channelized beams per signal;
generating multiple streams of bits by demodulating each of the beamformed signals, wherein demodulating each of the beamformed signals includes:
identifying modulation symbols by sampling each of the beamformed signals;
identifying sampling misalignments by performing clock recovery with respect to each of the beamformed signals; and
adjusting sampling of the beamformed signals in a manner that reduces the sampling misalignments; and
obtaining multiple data streams by decoding each of the streams of bits.

2. The method of claim 1, wherein the beamforming each of the signals by synthesizing at least two of the channelized beams per signal is done using an Inverse Fast Fourier Transform and a polyphase filter.

3. The method of claim 2, wherein the beamforming each of the signals by synthesizing at least two of the channelized beams per signal includes upsampling each of the signals.

4. The method of claim 1, wherein the digitizing the downconverted waveform includes generating complex samples of the downconverted waveform.

5. The method of claim 1, wherein the complex channelized representations of the digital sample stream are downsampled baseband representations, and wherein channelizing the digital sample stream includes:
inputting the complex samples of the downconverted waveform to a polyphase filtering block; and
obtaining the complex channelized representations of the digital sample stream by computing a Fast Fourier Transform on outputs of the polyphase filtering block.

6. An apparatus for simultaneously receiving one or more signals and performing beamforming with respect to the received signals, the apparatus comprising:
multiple antenna elements configured to receive a radio-frequency (RF) waveform that includes multiple signals, wherein each of the antenna elements includes:
a component configured to obtain a downconverted waveform by downconverting the RF waveform to an intermediate center frequency;
a conversion component configured to generate a digital sample stream by digitizing the downconverted waveform;
a channelizing component configured to channelize the digital sample stream by segmenting the digital sample stream into multiple complex channelized representations; and
a beamforming component configured to:
obtain channelized beam components by phase-shifting the complex channelized representations; and
contribute to forming channelized beams by adding, the channelized beam components, to channelized beam components obtained at other antenna elements in the phased array system; and
a computing device configured to:
receive multiple channelized beams collectively formed by the antenna elements; beamform multiple signals from at least two unique channelized beams per signal;
generate multiple streams of bits by demodulating the beamformed signals, wherein demodulating includes:
identifying modulation symbols by sampling the beamformed signals;
identifying sampling misalignments by performing clock recovery with respect to the beamformed signals being sampled; and
adjusting sampling of the beamformed signals in a manner that reduces the sampling misalignments; and
obtain multiple data streams by decoding each of the streams of bits.

7. The apparatus of claim 6, wherein the computing device is configured to beamform signals by using an Inverse Fast Fourier Transform and polyphase filtering.

8. The apparatus of claim 6, wherein digitizing a downconverted waveform includes generating complex samples of the downconverted waveform.

9. The apparatus of claim 6, wherein the channelizing component is configured to channelize a digital sample stream by:
inputting complex samples to a polyphase filtering block; and
performing a Fast Fourier Transform operation on outputs of the polyphase filtering block.

10. The apparatus of claim 9, wherein further, the multiple complex channelized representations are downsampled baseband signal representations.

11. The apparatus of claim 6, wherein the apparatus is configured to implement a common channelization scheme at each of the antenna elements, and wherein the apparatus is configured to receive an arbitrary number of signals characterized by arbitrary bandwidths and center frequencies.

12. The apparatus of claim 6, wherein the computing device is further configured to perform parallel processing and simultaneously beamform multiple signals.

13. The apparatus of claim 12, wherein the computing device is further configured to simultaneously demodulate multiple beamformed signals.

14. The apparatus of claim 6, wherein the computing device is further configured to simultaneously beamform multiple spectrally overlapped signals.

* * * * *

UNITED STATES PATENT AND TRADEMARK OFFICE
CERTIFICATE OF CORRECTION

PATENT NO.       : 9,031,165 B2
APPLICATION NO.  : 14/218730
DATED            : May 12, 2015
INVENTOR(S)      : Wayne Edward Richards Page 1 of 1

It is certified that error appears in the above-identified patent and that said Letters Patent is hereby corrected as shown below:

In the Claims:

Column 13, line 23, Claim 1 please delete "downcoverted" and insert --downconverted--.

Column 13, line 24, Claim 1 please delete "," between "stream" and "wherein".

Column 14, line 20, Claim 6 please delete "," between "adding" and "the".

Column 14, line 23, Claim 6 please delete "the" and insert --a--.

Column 14, line 44, Claim 8 please delete "downcoverted" and insert --downconverted--.

Signed and Sealed this
Tenth Day of November, 2015

Michelle K. Lee
*Director of the United States Patent and Trademark Office*